US007829043B2

(12) United States Patent
Grandjean et al.

(10) Patent No.: US 7,829,043 B2
(45) Date of Patent: Nov. 9, 2010

(54) METHOD FOR COPRECIPITATION OF ACTINIDES IN DIFFERENT OXIDATION STATES AND METHOD FOR PREPARATION OF MIXED COMPOUNDS OF ACTINIDES

(75) Inventors: Stéphane Grandjean, St Marcel de Careiret (FR); André Beres, Saint-Marcel d'Ardeche (FR); Christophe Maillard, Bagnols (FR); Jérôme Rousselle, Saint Priest (FR)

(73) Assignees: Commissariat a l'Energie Atomique, Paris (FR); Compagnie Generale des Matieres Nucleaires, Velizy-Villacoublay (FR)

( * ) Notice: Subject to any disclaimer, the term of this patent is extended or adjusted under 35 U.S.C. 154(b) by 966 days.

(21) Appl. No.: 11/140,282

(22) Filed: May 27, 2005

(65) Prior Publication Data

US 2005/0288542 A1 Dec. 29, 2005

(30) Foreign Application Priority Data

May 28, 2004 (FR) .................................. 04 51058

(51) Int. Cl.
*C01G 56/00* (2006.01)
(52) U.S. Cl. .............................. 423/3; 423/11; 423/12; 423/15
(58) Field of Classification Search ............... 423/3, 423/11, 12, 15
See application file for complete search history.

(56) References Cited

U.S. PATENT DOCUMENTS

| 4,235,740 | A | * | 11/1980 | Druckenbrodt et al. | ...... 252/643 |
| 7,169,370 | B2 | * | 1/2007 | Mesmin et al. | ................ 423/3 |
| 2004/0021132 | A1 | * | 2/2004 | Claire et al. | ................ 252/500 |

FOREIGN PATENT DOCUMENTS

| EP | 0251399 | 1/1988 |
| FR | 1465032 | 3/1967 |
| FR | 1329961 | 9/1973 |
| FR | 2815035 | 4/2002 |
| GB | 978615 | 12/1964 |
| WO | WO-97/25721 | 7/1997 |

| WO | WO-02/28778 | 4/2002 |

OTHER PUBLICATIONS

Altas, Y. et al., "Preparation of homogeneous $(Th_{0.8}U_{0.2})O_2$ pellets via coprecipitation of $(Th,U)(C_2O_4)_2$ nH20 powders", *Journal of Nuclear Materials*, 1997, p. 46-51 vol. 249.
Bhanushali, R.D., et al., "Removal of plutonium and americium from oxalate supernatants by co-precipitation with thorium oxalate", *Journal of Radioanalytical and Nuclear Chemistry*, 1999, p. 977-979, vol. 240, No. 3.
Keller, Von. C., et al., "Uber Karbonatokomplexe des dreiwertigen Americiums sowie des vier- und sechswertigen urans und plutoniums", *Radiochimica Acta*, 1969, p. 123-127, vol. 11, No. 3-4.
Michael, KM, et al., "Recovery of plutonium from oxalate supernatant by coprecipitation using uranous nitrate", *Bhasha Atomic Research Centre*, 1996, vol. e, No. 16.
Translation of the International Preliminary Report on Patentability prepared in corresponding International Patent Application No. PCT/FR2005/050377, filed May 26, 2005.

* cited by examiner

*Primary Examiner*—Steven Bos
(74) *Attorney, Agent, or Firm*—Brinks Hofer Gilson & Lione

(57) ABSTRACT

Method for coprecipitation (or simultaneous precipitation) of at least one actinide in oxidation state (IV) with at least one actinide in oxidation state (III), wherein:
 a solution i.e. mixture of actinide(s) in oxidation state (IV) and actinide(s) in oxidation state (III) is prepared by adding to it a singly charged cation whose presence makes it possible to stabilize the aforementioned oxidation states in the mixture, or a singly charged cation which does not act to stabilize the aforementioned oxidation states in the mixture;
 a solution containing oxalate ions is mixed with the said mixture of actinides in order to carry out coprecipitation, i.e. simultaneous precipitation, of the said actinides in oxidation states (IV) and (III) and a fraction of the singly charged cation.

According to another embodiment, a solution i.e. mixture of actinide(s) in oxidation state (IV) and actinide(s) in oxidation state (III) is prepared and a solution containing oxalate ions and a singly charged cation is added to the said mixture of actinides in order to carry out the coprecipitation.

Method for preparation of mixed compounds of actinides by calcining the precipitate which is obtained.

These mixed oxides such as mixed oxides, carbides or nitrides can be used especially in the fabrication of nuclear fuel, in the fabrication of transmutation targets or for the stable packaging of nuclear materials.

87 Claims, No Drawings

METHOD FOR COPRECIPITATION OF ACTINIDES IN DIFFERENT OXIDATION STATES AND METHOD FOR PREPARATION OF MIXED COMPOUNDS OF ACTINIDES

The present invention relates to a method for coprecipitation of actinides which have different oxidation states.

More precisely, the present invention relates to a method for coprecipitation i.e. simultaneous precipitation of a plurality of actinides, at least one of the actinides involved being in oxidation level (IV) and at least one of the actinides involved being in oxidation level (III).

The invention furthermore relates to a method for preparation of mixed compounds of actinides, especially mixed oxides, nitride or carbides of actinides.

The technical field of the invention may generally be defined as that of preparing mixed compounds of actinides, for example mixed oxides of actinides, especially the mixed oxide of uranium and plutonium $(U,Pu)O_2$; but also refractory mixed compounds including some of the group of actinides from thorium to californium. The invention more precisely concerns the fabrication of such mixed compounds, for example such mixed oxides, by coprecipitation then calcining.

It is indeed known that plutonium, most often mixed with other actinides, especially uranium, constitutes an energy-rich material which can be reprocessed, either in reactors of the "light water" type or in new generation reactors (such as fast neutron reactors or the like). Such a strategy has a number of advantages. In particular, it makes it possible to economize on fissile materials and constitutes a way of slowing down the undesirable growth of plutonium stock or, in the future, the stock of minor actinides.

The recycling of plutonium in pressurized water reactors (PWR) has thus become an industrial reality, the impact of which can be seen year on year by the fact that a growing number of the power reactors in use are being fuelled using assemblies involving a mixed oxide of uranium and plutonium, referred to as MOX $(UO_2\text{-}PuO_2)$.

For the future in new generation reactors, the use of fuels based on uranium, plutonium and minor actinides, such as neptunium, americium, curium and/or californium, is envisaged in the form of oxides, carbides or nitrides.

Extension of the use of MOX fuel, or the implementation of advanced fuels containing minor actinides in addition to plutonium, necessitates both control over the quality and reliability of the fabrication and control over the stringent constraints relating to the materials constituting the fuel, in order to achieve the intended performance of this fuel in a reactor.

At present, the powders involved in the fabrication of MOX are prepared by mechanically mixing the oxides $UO_2$ and $PuO_2$. After pressing, sintering and rectifying, the mixture obtained makes it possible to produce MOX fuel pellets which meet with current specifications.

The most well-established industrial method, known as the MIMAS method, includes two main steps for preparing the powders: co-grinding of the uranium and plutonium oxide powders in order to fabricate a first mixture, referred to as the stock mixture, which is characterized by a plutonium content of from 25 to 30%, then dry dilution of this stock mixture in uranium oxide until the intended final plutonium content is reached.

In order to fabricate fuels, the powders used must correspond to precise characteristics. They should especially have a good ability to flow, good compressibility characteristics and a capacity for compaction by sintering. An important quality criterion in the final properties of the sintered material is homogeneity in the distribution of the actinides, for example plutonium, in this material.

High homogeneity of this distribution in each sintered pellet is, on the one hand, very favourable for the behaviour of the MOX in a reactor, especially with a view to increasing the burn-up ratios, and on the other hand it facilitates complete dissolving of the irradiated fuel during the reprocessing operations.

This requirement for high homogeneity in the distribution of the actinides within the fuel is also essential for most of the fuel concepts intended for new generation reactors.

Besides the methods based on mixing and co-grinding powders, certain methods of co-conversion by precipitating or denitrating actinides in solution, such as uranium and plutonium in solution, constitute a way which also makes it possible after calcining to obtain a mixed compound, generally a mixed carbide, nitride or oxide such as $(U,Pu)O_2$, in which the distribution of the actinides is homogeneous on the micron or even submicron scale.

The main co-conversion methods have a number of potential advantages over the previous methods of mechanically mixing and co-grinding the powders:

- a priori more easily obtaining a very good homogeneity in the distribution of the actinides, such as U and Pu, within the fuel material, for example within each pellet;
- reducing the number of steps and simplifying the technology employed in the fabrication of materials based on a mixed refractory phase, generally a mixed oxide, carbide or nitride, for example MOX fuel, with conceivable omission of the grinding and mechanical homogenization stations;
- reducing the operational constraints associated with the handling of powders mainly consisting of minor actinides;
- reducing the quantity of refuse and waste from the method;
- reducing the accessibility to plutonium or another fissile actinide, and therefore reducing the risks of proliferation during the preliminary phase of nuclear material storage.

As opposed to the industrial methods of fabricating mixed oxides which are based almost exclusively on the mechanical mixing of oxide powders, the main characteristic common to most of the co-conversion methods is that the constituent elements of the material to be synthesized are mixed in solution.

Homogeneity of the distribution of these elements in the solid formed after chemical reaction(s) is generally obtained when it is desired. A second common characteristic is the last step, which is very generally a heat treatment in order to obtain the final material.

Among the methods for co-converting actinides into oxides, distinction may be broadly be made between three main families according to the way in which the solid phase is obtained from the initial mixture in solution: precipitation methods, sol-gel methods and thermal denitration methods:

- precipitation is the means most commonly mentioned and the oxalic, ammoniacal, carbonate, peroxide routes primarily used for simple conversion into an oxide, especially of uranium or plutonium, can be adapted and optimized for co-conversion;
- according to a similar principle, the sol-gel routes make it possible to achieve the solid state by means of a "gelling" step;
- "simple" heating of the solution also makes it possible to achieve the solid state: this type of conversion method is referred to as thermal denitration because the initial solution is very generally a nitric medium, and evaporation of the solution leads to the temporary formation of nitrate salts.

The last two types of co-conversion methods, i.e. the sol-gel method or the thermal denitration method, do not directly concern the field of the invention.

Sol-gel methods have the following drawbacks:

much less industrial experience for the conversion of actinide(s) than the precipitation methods, the generation of effluents containing ammonia, which remain difficult to manage especially in the presence of minor actinides, the use of a larger number of reagents, whose decomposition products it is generally necessary to recycle or eliminate.

Although simple in their concept, the denitration methods generally yield products of relatively mediocre quality, which quite often necessitate the use of additives and/or additional mechanical or thermal treatments downstream.

The co-conversion methods based on precipitation, or more precisely coprecipitation, involve the intermediate preparation of an insoluble salt, which is then separated and calcined in order to obtain the desired oxide.

These methods usually make it possible to obtain mixed compounds, such as oxides, of better quality after calcining. This is because these methods offer the opportunity to vary the physicochemical characteristics of the compounds with more flexibility by controlling the operating parameters of the coprecipitation and/or calcining.

It should be noted that a decontamination factor vis-à-vis other residual elements present in solution is generally obtained at the coprecipitation stage: these residual elements are, for example, impurities present in the actinide solutions to be precipitated, for instance fission products.

The extent of this factor varies according to the precipitating reagent and the conditions under which it is used.

In order to be able to carry out a coprecipitation method while maintaining a high level of benefit, a certain number of requirements have to be satisfied:

there must be conditions which ensure comparable and sufficiently high solubility of the elements mixed in solution before precipitation;

there must be conditions which ensure comparable and sufficiently high solubility of the elements mixed in solution during precipitation;

the precipitation kinetics of these elements must be substantially identical;

the insoluble salts used must be neither to stable or too unstable for the calcining step to be carried out easily and reliably;

management of the byproducts must not present insurmountable difficulties.

Among all the coprecipitation methods, distinction is usually made between two families in the case of actinides, especially uranium and plutonium: the one involving an approach in which the two elements are in the same oxidation state, and the one involving an approach in which the two elements are in different oxidation states.

The first approach is more immediate, and consists in coprecipitating the actinides at the same oxidation level in order to achieve perfectly simultaneous and homogeneous precipitation by co-crystallizing the two actinides in the same lattice: in the case of uranium and plutonium, for example, U(IV) and Pu(IV) fulfil equivalent roles.

The main difficulty of these methods involves the initial stabilization of this common oxidation state in solution.

These methods are illustrated in the document FR-A-2 815 035, which relates to actinides in oxidation state (IV).

This approach, however, cannot simply be applied to the preparation of mixed oxides based on uranium, plutonium, neptunium, protactinium and/or thorium, together with americium, curium, berkelium and/or californium.

The second approach, which consists in coprecipitating actinides such as U and Pu in different oxidation states, is a priori more complex and random.

The commonest form of these methods as encountered in reprocessing corresponds to the pairing U(VI)-Pu(IV), which is readily obtained in nitric solution. The mixture U(IV)-Pu(III) is also accessible in solution, so long as reducing conditions are maintained and/or the presence of an anti-nitrous agent is ensured.

These methods of coprecipitation according to the second approach, based on these pairings of U and Pu in solution, involve actinide ions which usually precipitate in the form of salts with different molecular structures. The precipitates obtained do not therefore correspond to perfect co-crystallization of the uranium and plutonium. As a consequence, the plutonium distribution homogeneity is intrinsically limited. The method of "U(VI)-Pu(IV) synprecipitation" in an ammoniacal medium may be mentioned as an example, in which a plutonium hydroxide and ammonium diuranate which yield inhomogeneous oxide powders are formed, necessitating disadvantageous mechanical treatments.

Furthermore, the non-simultaneous precipitation phenomena and the solubility differences which are observed under these conditions mean that all these methods have inherent deficiencies. The case of oxalic precipitation may be mentioned as an example, in which the following are observed:

a significant solubility difference between the uranyl (U(VI)) oxalate and plutonium(IV) oxalate;

an offset of the respective precipitation ranges of plutonium(III) and uranium(IV) oxalates.

Furthermore, the solubility of these uranium and plutonium salts is not influenced in the same way by the parameters of the method, such as acidity and the like.

In other words, in order to induce simultaneous and homogeneous precipitation of all the actinides involved, the methods of coprecipitation according to the second approach involving actinides in different oxidation states must fulfil one of the following two conditions:

Existence of a range of chemical conditions conducive to the simultaneous and homogeneous precipitation of different structures, each associated with a given oxidation state, which is generally difficult to achieve unless a compromise is made in the precipitation conditions, to the detriment of the precipitation yields and the homogeneity in the distribution of the actinides in the precipitated solid;

Co-crystallization of the actinides within the same crystal structure, which implies at least two sites for the actinides within the structure, each associated with a given oxidation state, or one site capable of accepting two different oxidation states. If it exists, this common structure is generally formed for one or more well-defined proportions of each of the actinides. This constitutes a handicap for the flexibility of a method of preparing mixed compounds, when actinide compositions other than those of the compounds obtained by co-crystallization are desired.

In the second approach, which we will more particularly address here, the preparation of mixed compounds with characteristics of very good homogeneity in the distribution of the actinides in the precipitated solid then in the material, for example a fuel pellet, therefore requires that a certain number of difficulties be overcome.

Among the documents illustrating the coprecipitation of actinides, the following documents may be mentioned:

The document by K M. MICHAEL; P S. DHAMI "Recovery of plutonium from oxalate supernatant by coprecipitation in using uranous nitrate" BARC/1996/E: 016 (1996) describes the recovery by coprecipitation of plutonium contained in oxalic stock solutions resulting from its conversion, by adding uranous nitrate to the said stock solutions.

The aim pursued in this document is basically to reduce the losses of plutonium in the precipitation stock solutions by causing a second precipitation of the plutonium, rather than to fabricate by a single coprecipitation compounds which are capable of yielding a perfectly homogeneous mixed oxide by calcining, such as $(U,Pu)O_2$.

Likewise, the document by R D. BANUSHALI; I C. PIUS; S K. MUJERKEE; V N. VAIDYA "Removal of plutonium and americium from oxalate supernatants by coprecipitation with thorium oxalate", Journal of radioanalytical and nuclear chemistry 240; (3) 977-979 (1999) relates to the joint recovery of plutonium and americium in oxalate effluents ("supernatants") by addition of thorium oxalate to these effluents then coprecipitation.

The aim pursued in this document is similar to that of the previous document. It is to reduce the losses of plutonium and americium in the oxalic stock solutions for precipitation of Pu and Am, while confining these two radioelements in a solid matrix.

The document by C. KELLER; D. FANG "Über Karbonatokomplexe des dreiwertigen Americiums sowie des vier- und sechswertigen Urans und Plutoniums", Radiochimica Acta 11, 3-4, pages 123-127 (1969) relates to a method of obtaining a homogeneous $(U,Pu)O_2$ precipitate. The uranium and plutonium, initially in state VI, are reduced jointly to oxidation state IV by electrolysis in an alkaline medium, in the presence of carbonate.

The carbonate complexes obtained are then precipitated and decomposed into an oxide by heating in a vacuum. The main drawbacks associated with this method are the need to work in an alkaline medium and the complexity of the calcining operation.

The document EP-A-0 251 399 relates to the preferential precipitation of plutonium from a dilute organic phase laden with plutonium and uranium, for example TBP, by adding an aqueous mixture of oxalic acid and nitric acid. The precipitated plutonium oxalate is dried and converted into plutonium oxide by heating.

In this method, the uranium which very partially accompanies the plutonium in the final compound formed is in oxidation state VI in the organic phase, whereas the plutonium is in oxidation state IV. This final compound does not have the optimal qualities desirable for obtaining perfectly homogeneous mixed oxides.

The document WO-A-97/25721 relates to the joint precipitation of uranium and plutonium, in order to separate them from the various elements present in a solution of irradiated fuels. The method involves carboxylic or polycarboxylic acids for precipitating uranium in oxidation state VI and plutonium in oxidation state IV. This method is characterized by the absence of any endeavour for homogeneity in the precipitate which is formed. The U,Pu oxidation state difference is in this case manifested by a segregation phenomenon, noted in the document, which leads to preferential precipitation of the plutonium while a not insignificant proportion of the uranium remains in solution.

The document by Atlas, "J. Nucl. Materials", 249(97) 46-51 relates to a method for oxalic coprecipitation of U and Th. This is an extremely particular case because of the existence of a single stable oxidation state (IV) of thorium in solution leads to the absence of any possibility of redox reaction with U(IV), which is not the case with the very great majority of other actinide complexes. In this document, which relates to the pairing Th(IV)-U(IV), actinides in the same oxidation state are in fact coprecipitated. With thorium having only one oxidation state (IV) in solution, such coprecipitation by co-crystallization of the actinides is thus relatively easy to obtain. This method could possibly be applied to all the pairings Th-An(IV), where An is Pa, Np or Pu. On the other hand, application of this method could not be envisaged for Th-U(IV)-Pu(IV), for example, because U(IV) and Pu(IV) cannot coexist simply in solution: in this regard, reference may be made to the document FR-A-2 815 035 cited below.

The method developed in this document therefore proves beneficial for the fabrication of fuels of the thorium series (U,Th), but it is absolutely not applicable per se to the production of other homogeneous co-oxides for MOX fuel, such as U,Pu co-oxides, since it does not ensure maintenance of the oxidation state IV during the precipitation, and therefore co-crystallization of uranium and plutonium.

In other words, the method described in this document has the sole purpose of preparing (U,Th) co-oxides by coprecipitation. It cannot be applied to the preparation of $(U,Pu)O_2$ solid solutions by coprecipitation, which are perfect for the fabrication of fuels such as MOX fuel, or a very great majority of mixed oxides involving at least two actinides among the actinides ranging from thorium to californium, according to the order of the periodic table of the elements.

The document FR-A-2 815 035 already mentioned above relates to a method for coprecipitation of actinides in oxidation state (IV), and to a method for preparing mixed oxides of actinides by calcining the precipitate which is obtained. These mixed oxides can be used particularly in the fabrication of nuclear fuels of the MOX type.

The coprecipitation method in this document involves complexing the actinides in oxidation state (IV) so as to stabilize them kinetically and thermodynamically as a mixture in solution in this oxidation state (IV), before coprecipitation. The coprecipitates obtained are perfectly homogeneous mixed compounds, since they are obtained by co-crystallization. After suitable calcining, perfectly homogeneous mixed oxides are produced.

This method cannot be applied to the following actinides because it is impossible to maintain them simply in oxidation state (IV) in solution under the conditions described: americium, curium, berkelium or californium. This coprecipitation method is not always simple to use, stabilization of the actinide (IV) mixture in particular requiring several steps, and it is not readily compatible with the continuous coprecipitation operations often required for industrial fabrication.

There is therefore a need, as yet unsatisfied, for a method by which it is possible to coprecipitate actinides in solution in different oxidation states: i.e. (IV) and (III), especially in an acidic medium such as a nitric acid medium.

There is particularly a need for a method in which the mutual redox reaction of the actinides in solution is negated in order to maintain the respective different oxidation states (IV) and (III) of the actinides in solution, and to obtain coprecipitation of these elements actually in the different respective oxidation states (IV) and (III).

In other words, there is a need for a method in which the actinides are kept in solution in different respective oxidation states (IV) and (III) so that they can subsequently be engaged by coprecipitation in homogeneous mixed compounds which, after calcining, will make it possible to obtain homogeneous mixed compounds such as mixed oxides approximating a perfect solid solution and not containing inorganic impurities.

In other words there is a therefore a need, as yet unsatisfied, for a method making it possible both:
to coprecipitate actinides stabilized or present in oxidation states (IV) and (III) in solution, particularly in an acidic medium such as a nitric acid medium,
and to obtain a solid mixed compound with a controlled composition which is very homogeneous, i.e. with a homogeneity equal or close to the homogeneity of actinide solid solutions, and which qualitatively and quantitatively contains the actinides in oxidation states (IV) and (III) initially present in solution.

There is particularly a need for a method in which the "major" actinides, i.e. uranium and plutonium, can be coprecipitated with the "minor" actinides, i.e. neptunium, americium, curium, to form a homogeneous mixed compound such as an oxalate, which yields a homogeneous mixed phase such as an oxide when calcined.

There is furthermore a need for a method which is compatible with:
the media used in the fuel cycle, i.e. conventionally a nitric medium,
the associated equipment (simplicity, robustness),
continuous operation,
restrictive management of the reagents and effluents in a confined and highly radioactive environment.

It is an object of the present invention to provide a method for coprecipitation (or simultaneous precipitation) of at least one actinide in oxidation state (IV) with at least one actinide in oxidation state (III), which meets inter alia all the needs mentioned above and which satisfies the requirements already mentioned above for coprecipitation methods in general.

It is also an object of the present invention to provide a method for coprecipitation of at least one actinide in oxidation state (IV) with at least one actinide in oxidation state (III), which does not have the drawbacks, limitations, deficiencies and disadvantages of the methods in the prior art and which resolves the problems of the prior art.

This and other objects are achieved according to the invention by a method for coprecipitation (or simultaneous precipitation) of at least one actinide in oxidation state (IV) with at least one actinide in oxidation state (III), in which:
in a first embodiment of the method, which is the most general case in which it is necessary to stabilize the oxidation state (IV) or (III) of one or more actinides in solution:
a) a singly charged stabilizing cation consisting only of oxygen, carbon, nitrogen and hydrogen atoms, or a compound such as a salt capable of forming this cation, is added to one or more solutions of actinide(s) containing overall at least one actinide $An^1$ and at least one actinide $An'^1$, so as to obtain a solution, mixture, of at least one actinide $An^1$ in oxidation state (IV), at least one actinide $An'^1$ in oxidation state (III) and the said singly charged stabilizing cation, the value of the oxidation states (IV) and (III) having optionally been obtained during a preliminary or simultaneous step of chemical or electrochemical reduction;
b) a solution of oxalic acid or one of its salts or a derivative thereof is added to the said mixture, by means of which simultaneous precipitation of the said actinides $An^1(IV)$ and $An'^1(III)$ and a fraction of the singly charged stabilizing cation from the said mixture is carried out.

The singly charged stabilizing cation consisting only of oxygen, carbon, nitrogen and hydrogen atoms, or the compound such as a salt capable of forming this cation, is generally added in the form of a solution of the said cation, or compound such as a salt capable of forming this cation, which solution is mixed with the said one or more solution(s) of actinides.

Step a) of the method of the invention in this first embodiment may, for example, be carried out in the following way:
a singly charged stabilizing cation consisting only of oxygen, carbon, nitrogen and hydrogen atoms, or a compound such as a salt capable of forming this cation, is added to at least a first aqueous solution of at least one actinide $An^1$, so as to stabilize the oxidation state of the one or more $An^1$ at the value (IV), this value (IV) of the oxidation state having optionally been (being) obtained during a preliminary or simultaneous step of chemical or electrochemical reduction;
the said singly charged stabilizing cation is added to at least a second aqueous solution of at least one actinide $An'^1$, so as to stabilize the oxidation state of the one or more $An'^1$ at the value (III), this value (III) of the oxidation state having optionally been obtained during a preliminary or simultaneous step of chemical or electrochemical reduction;
the said at least first and second solutions each containing the singly charged stabilizing cation are, mixed, preferably intimately; and step b) is then carried out.

The said mixture, solution, which contains at least one actinide $An^1(IV)$ and at least one actinide $An'^1(III)$ and is stabilized by the said singly charged cation, such as an antinitrous agent, may also be obtained more directly than by mixing the said at least first and second solutions each containing the singly charged stabilizing cation. In particular, it may be obtained by adding the said singly charged stabilizing cation to a single solution containing at least one actinide $An^1$ capable of being stabilized at oxidation level (IV) and at least one actinide $An'^1$ capable of being stabilized at oxidation level (III), optionally during a preliminary or simultaneous, chemical or electrochemical step of redox adjustment of the said actinides $An^1$ and $An'^1$ respectively in oxidation states (IV) and (III). The said mixture may also be obtained, sometimes advantageously, during the fuel reprocessing operations, for example by reverse co-extraction of the said actinides $An^1(IV)$ and $An'^1(III)$ present in an organic phase in an aqueous solution containing the singly charged stabilizing cation.

In general, the said mixture may be obtained in various ways: it contains the said actinides $An^1(IV)$ and $An'^1(III)$ whose oxidation states are stabilized particularly in the presence of the said singly charged cation.

In a second embodiment of the method according to the invention, which is a particular case in which the respective oxidation states (IV) and (III) of the at least two actinides involved are stable within the same solution, without having to employ a stabilizing compound such as an anti-nitrous agent as in the first embodiment:
at least a first aqueous solution of at least one actinide $An^1$ in oxidation state (IV) and at least a second aqueous solution of at least one actinide $An'^1$ in oxidation state (III) are mixed, preferably intimately;
a singly charged cation consisting only of oxygen, carbon, nitrogen and hydrogen atoms and not having redox properties vis-à-vis the actinides to be coprecipitated, or a compound such as a salt capable of forming this cation, is added to the said mixture in order to obtain a solution containing the actinides to be precipitated and the singly charged cation;

a solution of oxalic acid or one of its salts or a derivative thereof is added to the said mixture which is obtained after adding the singly charged cation, by means of which simultaneous precipitation of the actinides in oxidation states (IV) and (III), i.e. $An^1(IV)$ and $An'^1(III)$, and a fraction of the singly charged cation from the said mixture is carried out.

In general, the said mixture may be obtained in various ways: it contains the said actinides $An^1(IV)$ and $An'^1(III)$ and the said added singly charged cation.

In a third embodiment of the method according to the invention:

an aqueous solution containing at least one actinide in oxidation state (IV) and at least one actinide in oxidation state (III) is prepared, for example by simply mixing at least two solutions each containing one of the said actinides in the relevant oxidation state, when the said actinides in the said relevant oxidation states can coexist within the same solution;

a solution of oxalic acid or one of its salts or a derivative thereof, to which a singly charged cation consisting only of oxygen, carbon, nitrogen and hydrogen atoms, or a compound such as a salt capable of forming this cation, has been added, is added to the said solution of actinides, by means of which simultaneous precipitation of the actinides in oxidation states (IV) and (III) from the said solution of actinides and a fraction of the said cation contained in the solution is carried out.

In this third embodiment of the method, a singly charged cation consisting only of oxygen, carbon, nitrogen and hydrogen atoms is thus added in the precipitating solution of oxalic acid or one of its salts or a derivative thereof, instead of being added in the solution containing the actinides to be precipitated.

In this third version, in the particular case in which the respective oxidation states (IV) and (III) of the at least two actinides involved are stable within the same solution, without having to employ a stabilizing compound such as an anti-nitrous agent, the said singly charged cation is for example identical to the one which would be added to the initial solution of actinides if the second embodiment were used.

In this third embodiment, if the respective oxidation states (IV) and (III) of the at least two actinides involved are not stable in the solution i.e. mixture containing the actinides to be precipitated, an additive, stabilizing agent—cationic or non-cationic—is added beforehand in this mixture, or in the actinide solutions used when preparing this mixture. This additive is selected, for example, from compounds which can maintain reducing conditions in solution or from anti-nitrous compounds.

In this third embodiment, when the said solution of oxalic acid or one of its salts or a derivative thereof is added, the said singly charged cation should preferably not modify the oxidation states of the actinides pre-existing in the said actinide solution, mixture before this addition.

The present invention is based on a novel coprecipitation route, using a (IV)-(III) oxalic route after addition of a singly charged cation (consisting only of oxygen, carbon, nitrogen and hydrogen atoms) or simultaneously with the addition of a singly charged cation in solution, which makes it possible to coprecipitate quantitatively all of the actinides (IV) and (III) present in solution, very generally into a mixed oxalate compound of one or more actinides (IV) and one or more actinides (III).

The singly charged cation is in the general case a singly charged so-called "stabilizing" cation, which is preferably an anti-nitrous agent employed for stabilizing the oxidation states (IV) and (III) of the actinides, or otherwise in the second and third embodiments it is the cation added prior to precipitation in the actinide mixture and/or in the oxalic acid solution.

In the general case (first embodiment), the cation (for example: hydrazinium ion for U(IV)-Pu(III)) is used to stabilize the oxidation states and contribute to forming of the mixed compound containing U(IV) and Pu(III) during the coprecipitation.

The cation in the $2^{nd}$ and $3^{rd}$ cases, for example the ammonium ion for Pu(IV)-Am(III), contributes to forming the mixed compound containing for example Pu(IV) and Am(III) during the coprecipitation, without necessarily having a role of stabilizing the oxidation states.

This singly charged cation enters very generally into the structure of the precipitated compound and is very generally responsible for the formation of mixed oxalate structures of one or more actinides (IV) and one or more actinides (III) with the beneficial properties. The advantage of these structures is:

that they are very generally more insoluble than the known structures of simple actinide oxalate (IV) or simple actinide oxalate (III), which are formed under the conditions of the coprecipitation but without the presence of the said cation, that very generally the sites of the actinides (IV) and the actinides (III) in these structures are equivalent, despite the charge difference: this makes it possible to obtain perfectly homogeneous (on the molecular scale) precipitates, which accommodate all of the actinides (IV) and (III) initially present in solution, and do so in a wide range of relative compositions with respect to one or more actinides (IV) and one or more actinides (III).

In certain cases although not being equivalent, these sites are similar on the molecular scale and may be only partially occupied, which makes it possible to obtain characteristics very like those mentioned above, that the minor actinides such as americium, curium, or even berkelium and californium can be coprecipitated quantitatively, for example with a precipitation yield of more than 95% for each actinide initially present in solution at a concentration of more than $5.10^{-3}$ mol.l$^{-1}$, with thorium and/or protactinium and/or uranium and/or neptunium and/or plutonium.

In other words, according to the invention a solution of at least one actinide (IV) and at least one actinide (III) is prepared, in particular by adding thereto a singly charged stabilizing cation in the general case in which this cation makes it possible to stabilize, or contributes to stabilizing, at least one of the actinides in oxidation state (IV) or at least one of the actinides in oxidation state (III) in this solution. The solution is, for example, prepared by mixing at least one solution of actinide (IV) and at least one solution of actinide (III) after adding the said singly charged cation in each solution.

In the non-general case, a singly charged cation or a salt forming it in situ is added in the solution of actinides and/or the solution of oxalic acid or one of its salts or a derivative thereof, which is used to during the coprecipitation.

The simultaneous and homogeneous precipitation of the actinides can then be obtained by adding a solution of oxalic acid or one of its salts or a derivative thereof. Quantitative precipitation yields, for example more than 95% for each actinide initially present in solution at a concentration of more than $5.10^{-3}$ mol.l$^{-1}$, and a submicron homogeneity in the distribution of all the actinides in the solid, are obtained.

It is very clear that besides the advantages mentioned below, the method according to the invention also has all the previously mentioned advantages of the precipitation methods.

The method of the invention differs from the method described in the document FR-A-2 815 035 by the use of actinides at oxidation levels (IV) and (III), instead of exclusively actinides at oxidation level (IV).

By comparison, the method of the invention makes it possible to minimize the utilization of complexing additives necessary for kinetic or thermodynamic stabilization of the actinides at oxidation levels (IV) prior to the coprecipitation.

It also makes it possible to achieve a very good homogeneity of the coprecipitated solid, at least as good as that obtained by the method in the document FR-A-2 815 035, in a wide range of chemical conditions for variable proportions of the different actinides.

Above all, the method of the invention extends this application to all the actinides, from thorium to californium, in so far as it is based on the coprecipitation of one or more actinides (IV) and one or more actinides (III). It can thus be applied to the fabrication of mixed compounds with all the possible combinations of actinides, so long as this compound contains at least one of the following actinides: thorium, protactinium, uranium, neptunium and plutonium, and at least one of the following actinides: plutonium, americium, curium, berkelium, californium, in order to ensure the initial presence in solution of at least one actinide in oxidation state (IV) and at least one actinide in oxidation state (III).

Lastly, the method according to the invention can be applied more easily to continuous preparation of mixed actinide compounds: it can in particular be applied to the conventional chemical engineering used in industrial plants for oxalic conversion of plutonium into $PuO_2$.

The method according to the invention preferably applies to the coprecipitation of two actinides, although it can also make it possible to coprecipitate more than two actinides, for example up to four actinides.

In this case, for example in the first embodiment of the invention, a solution of n actinides (IV) and m actinides (III) is a prepared, in particular by adding thereto a singly charged stabilizing cation, i.e. a cation which makes it possible to stabilize, or which contributes to stabilizing, at least one of the actinides in oxidation state (IV) or (III) in this solution. The solution is, for example, prepared by intimately mixing n solutions of actinide in oxidation state (IV) and m solutions of actinide in oxidation state (III), in which case m may be equal to or different from n, after adding the said singly charged cation in each solution, from the solution of $An^1$ to the solution of $An^n$ in oxidation state (IV) and from the solution of $An'^1$ to the solution of $An'^m$ in oxidation state (III).

The simultaneous precipitation of the said $An^1$(IV), $An^2$(IV), ... $An^n$(IV) and $An'^1$(III), $An'^2$(III), ... $An'^m$(III) and the said cation from the said mixture is then carried out.

The second embodiment and the third embodiment of the method of the invention apply in the same way to n+m actinides.

The invention will be generally described below in the case of two actinides, but it is to be understood that this description may be applied to a number of actinides greater than 2.

In the first embodiment of the method of the invention, the singly charged cation also generally acts as an agent for stabilizing the actinides in oxidation states (III) and (IV) which are in the solution, and it also generally acts as an anti-nitrous agent. In the case of the first embodiment, the singly charged cation will therefore generally be selected from the hydrazinium ion; and hydrazinium ions comprising one or more alkyl groups.

The optionally non-cationic stabilizing agent furthermore used in the third case may be selected from anti-nitrous and/or antioxidant compounds. It preferably consist only of oxygen, carbon, nitrogen and hydrogen atoms. This stabilizing agent may be selected from the following non-exhaustive list:

From sulfamic acids and their derivatives, compounds having anti-nitrous properties such as sulfamic acids and its salts being preferred.

From hydrazine and hydrazine derivatives, compounds having anti-nitrous properties such as hydrazine and its salts being preferred.

From hydroxylamine and hydroxylamine derivatives, compounds having anti-nitrous and/or antioxidant properties vis-à-vis certain actinides being preferred, such as hydroxylamine and its salts.

Among the anti-nitrous agents, mention may be made of urea and its derivatives; the family of oximes; the hydroxamic acid family and its derivatives.

Among the anti-nitrous and/or antioxidant agents vis-à-vis certain actinides, hydrogen peroxide may be mentioned.

Among the antioxidants vis-à-vis certain actinides, ascorbic acid and its salts may be mentioned.

The precipitating agent is oxalic acid, its salts such as ammonium oxalate, or its derivatives such as alkyl oxalates; in fact, its use leads to a series of particular additional advantages which will be explained below.

The solution subjected to precipitation, containing the actinides $An^1$ and $An'^1$ respectively in oxidation state (IV) and in oxidation state (III), and the first solution of an actinide $An^1$ and the second solution of an actinide $An'^1$ which may have been used to prepare it, are generally acidic solutions, preferably aqueous acidic solutions. More preferably, they are aqueous nitric acid solutions.

The concentration of the actinides $An^1$ and $An'^1$ in the solution containing the actinides which is subjected to precipitation may vary within wide limits, but it is generally from $10^{-4}$ to 1 mol.l$^{-1}$, and it is preferably from 0.1 to 0.2 mol.l$^{-1}$.

The ratio of the number of moles of singly charged cation present in the solution of actinides and/or in the precipitating oxalic solution, a fraction of which is used for the coprecipitation of the actinides, to the number of moles of all the actinides $An^1$ and $An'^1$ to be precipitated is generally from 0.5 to 5, preferably from 0.5 to 1.

The concentrations of the actinides present in the solutions i.e. mixtures prepared or available before coprecipitation are generally fixed, for example during the initial mixing operations, at values corresponding to the respective proportions of the actinides in a mixed compound (for example oxide) preparable by calcining from the coprecipitate which is obtained.

In the solution containing the actinides subjected to precipitation, at the time of the coprecipitation, the sum of the molar concentrations of the actinides in oxidation state (IV) (thorium, protactinium, uranium, neptunium and/or plutonium depending on the application) preferably exceeds the sum of the molar concentrations of the actinides in oxidation state (III) (americium, curium, berkelium, californium and/or plutonium depending on the application).

Both in the step of preparing the solutions and in the mixing step, and in the step of coprecipitation i.e. simultaneous precipitation, the method is generally carried out at between 0°

C. and boiling point, preferably at a temperature close to room temperature, for example from 20 to 60° C.

The precipitation pH depends in particular on the mixed oxalates to be precipitated, but it is generally less than 1, and the final acidity i.e. in the precipitation medium after a reaction is close to 1 mol.l$^{-1}$.

In the second embodiment of the method of the invention, the solution subjected to precipitation containing An$^1$ and An$^{i1}$ respectively in oxidation state (IV) and in oxidation state (III), and the first and second solutions of the actinides An$^1$ and An$^{i1}$ which may have been used to prepare it, are generally acidic solutions, preferably aqueous acidic solutions.

They are preferably aqueous nitric acid solutions.

The concentration of the actinides An$^1$ and An$^{i1}$ in the solution containing the actinides which is subjected to precipitation may vary within wide limits, but it is generally from 10$^{-4}$ to 1 mol.l$^{-1}$, and it is preferably from 0.1 to 0.2 mol.l$^{-1}$.

The singly charged cation is a (non-stabilizing) cation such as ammonium or a quaternary ammonium.

The co(precipitation) or simultaneous precipitation is then carried out under the same conditions as for the first embodiment of the method.

The method in the second embodiment is generally carried out at between 0° C. and boiling point, preferably at a temperature close to room temperature, both in the mixing step and in the precipitating agent addition step, and in the simultaneous precipitation step.

The invention also relates to a method for preparation of mixed compounds of actinides An$^1$ and An$^{i1}$, in which the said actinides are coprecipitated by the method according to the invention as described above, either in its first embodiment or in its second embodiment, or in its third embodiment, then the (co)precipitate obtained in this way is calcined.

The mixed actinide compounds obtained are generally selected from mixed oxides, carbides and nitrides of actinides.

Since, according to the invention, the compounds obtained after the coprecipitation are homogeneous mixed oxalates, i.e. compounds in which the actinides (IV) and (III) occupy sites which are equivalent or similar on the molecular scale, the mixed compounds e.g. mixed oxides prepared after calcining are very homogeneous compounds in terms of the distribution of the actinides within them, i.e. very generally on the micrometre scale at most and even on the molecular scale in the case of obtaining a perfect solid solution.

The mixed compounds such as mixed oxides can furthermore be obtained in any proportions.

In terms of their composition, and this is one of the unexpected main advantages afforded by the invention, the mixed compounds may comprise all the actinides from thorium to californium in their composition, so long as at least one of the following actinides is included in this composition: thorium, protactinium, uranium, neptunium, plutonium, and at least one of the following actinides: plutonium, americium, curium, berkelium, californium, in order to ensure according to the invention the initial presence in solution of at least one actinide in oxidation state (IV) and at least one actinide in oxidation state (III).

Preferably, the total proportion of actinides (IV) such as thorium, protactinium, uranium, neptunium and plutonium (if its oxidation level is (IV) in the coprecipitation), exceeds the total proportion of actinides (III) such as americium, curium, berkelium, californium and plutonium (if its oxidation level is (III) in the coprecipitation). This is the consequence of a preferred coprecipitation method according to the invention, in which the total molar concentration of actinides in oxidation state (IV) exceeds the total molar concentration of actinides in oxidation state (III) at the time of the coprecipitation.

The calcining is generally carried out under the following conditions:
  temperature equal to or greater than 650° C.;
  oxidizing, inert or reducing atmosphere, the choice of which depends on the nature of the intended mixed compound;
  duration of the calcining generally greater than or equal to one hour.

The oxidizing atmosphere is generally an atmosphere comprising oxygen, such as air.

The inert atmosphere is generally an atmosphere comprising argon or helium.

The reducing atmosphere is generally an atmosphere comprising an inert gas mixed with hydrogen or methane.

For the synthesis of mixed nitrides, the atmosphere is preferably a mixture of nitrogen and hydrogen.

For the synthesis of mixed carbides, the atmosphere is preferably inert or reducing.

For the synthesis of mixed nitrides or carbides, a quantity of carbon which is very generally superstoichiometric with respect to the quantity of actinides, for example in the form of active carbon with a high specific surface (i.e. several hundred m$^2$/g), is furthermore preferably added during the calcining in order to facilitate the carbothermic reduction at a higher temperature, i.e. generally greater than or equal to 1000° C.

The mixed compounds obtained in this way are used in particular for the fabrication of nuclear fuel, for example of the uranium and plutonium mixed oxide type referred to as MOX, or such as a mixed carbide or nitride or oxide of uranium, neptunium, plutonium, americium and curium as envisaged for new generation nuclear reactors.

The mixed actinide compound prepared according to the invention can be used as a primary material with a view to preparing a refractory phase of different composition by mixing powders.

In particular, an oxide of uranium and plutonium prepared according to the invention may be used either in the form of a stock mixture of powders or in the form of a powder mixture at the final level. The rest of the method for preparing MOX fuel pellets is known, and conventionally comprises steps of pressing, sintering and rectifying.

The method according to the invention may also advantageously be used for the fabrication of transmutation targets (based on Np, Am and/or Cm, for example) or for the stable packaging of materials (U, Np, Am, Cm, Th, Pa, Bk, Cf) in the form of oxides, the oxides being prepared according to a procedure similar to those described below.

The method according to the invention will now be described in detail in the following description, which is given by way of illustration without implying any limitation.

The first embodiment of the method of the invention, which is the most general case, will be described first.

In this case a singly charged stabilizing cation, which may also be referred to as a stabilizing agent in cationic form, is first added to at least a first aqueous solution of at least one first actinide An$^1$ which is in oxidation state (IV).

The said singly charged cation preferably also acts as an anti-nitrous agent.

Optionally, the said aqueous solution previously or simultaneously undergoes a step of chemical or electrochemical reduction in order to obtain the oxidation state (IV) for An$^1$.

This chemical or electrochemical reduction may, for example, be carried out under the following conditions:

For uranium, the reduction of U(VI) to U(IV) in a nitric medium may be carried out by hydrogen under pressure with a catalytic support, in the presence of an anti-nitrous agent; for neptunium, the reduction of Np(VI) or Np(V) to Np(IV) may be carried out by hydroxylamine in a nitric medium; for plutonium, the reduction of Pu(VI) to Pu(IV) may be carried out in a nitric medium by adding hydrogen peroxide; for protactinium, the reduction of Pa(V) to Pa(IV) may be carried out by electrolysis in a complexing acidic medium.

This solution of actinide (IV) is generally an acidic solution, preferably an aqueous nitric acid solution.

The singly charged stabilizing cation, preferably also acting as an anti-nitrous agent, is generally selected from hydrazinium and alkyl-hydrazinium ions, a preferred cation being the hydrazinium ion. This singly charged cation is generally introduced into the solution in the form of a compound, such as a salt, which can provide this singly charged cation under the acidic conditions of the solution, or a concentrated solution of the nitrate of this cation prepared by slowly mixing a hydrazine base solution and a nitric acid solution.

The acid concentration in the solution is generally from 0.1 to 5 mol.l$^{-1}$, preferably from 1 to 1.5 mol.l$^{-1}$.

The concentration of actinides An$^1$ in oxidation state (IV) in this solution is generally from 10$^{-4}$ to 1 mol.l$^{-1}$, preferably between 0.1 and 0.5 mol.l$^{-1}$.

In the same way as a first solution of actinide An$^1$(IV) comprising a singly charged stabilizing cation was prepared, a second solution of actinide An$^{1}$(III) e.g. Pu(III) is prepared separately, preferably simultaneously; this preparation is generally carried out under the same conditions as those described above for the first solution, while adapting the operating conditions if need be.

The prior or simultaneous chemical or electrochemical reduction in order to obtain An$^{1}$(III) may, for example, be carried out under the following conditions: for plutonium, the reduction of Pu(IV), Pu(V) or Pu(VI) to Pu(III) may be carried out in a nitric medium in the presence of hydrazinium ions by electrolysis at a suitable potential or by moderate heating of the solution (50-60° C.).

It is preferable to add the same singly charged stabilizing cation, preferably acting as an anti-nitrous agent, as that used before.

The cation, which also acts as an anti-nitrous agent, is preferably the hydrazinium ion. The solution of actinide (III) is generally an acidic solution, preferably an aqueous nitric acid solution.

The acid concentration in the solution of actinide (III) is generally from 0.1 to 5 mol.l$^{-1}$, preferably from 1.0 to 1.5 mol.l$^{-1}$.

The concentration of actinides An$^{1}$(III) in the second solution is generally from 10$^{-4}$ to 1 mol.l$^{-1}$, preferably between 0.1 and 0.5 mol.l$^{-1}$.

Preferably therefore, the at least two solutions of actinide (III) and actinide (IV) are both aqueous solutions, preferably aqueous nitric acid solutions.

The solutions of actinide (IV) and actinide (III) prepared in this way are intimately mixed, for example using an agitator.

The term intimately mixed is intended to mean that the medium is homogeneous on the micro-mixing scale.

The stability of the oxidation states (IV) and (III) due to the addition of the stabilizing cation is such that the two solutions are mixed without being hampered by redox reactions, and without affecting the oxidation state (IV) and the oxidation state (III) of the actinides An$^1$ and An$^{1}$ before mixing.

In the mixture obtained, very generally no reaction between An$^1$(IV) and An$^{1}$(III) is observed, and the solution forming the mixture is stable over a long period, which may range from 5 hours to more than 7 days. A long time is therefore available for carrying out the final step of coprecipitation or simultaneous precipitation.

The mixing proportions of the at least two solutions of actinide(s) (IV) and (III) are those which correspond to the ratios An$^1$/An$^{1}$ in the final mixed oxide.

The mixing may be carried out in any proportion (0<An$^1$/An$^{1}$<100%). It is preferably is carried out so that the proportion of An$^1$ is more than that of An$^{1}$.

For example, in the case when the intention is to obtain the mixed oxide of uranium and plutonium of formula (U$_{0.725}$, Pu$_{0.275}$)O$_2$ after the calcining, the mixing proportion of the two solutions, one of U(IV) and the other of plutonium (III), will respectively be 72.5% and 27.5%.

Likewise, for example, in the case when the intention is to obtain the mixed oxide of uranium and curium of formula (U$_{0.90}$Cm$_{0.10}$)O$_2$ after the calcining, the mixing proportion of the two solutions, one of U(IV) and the other of Cm(III), will respectively be 90% and 10%.

It should be noted that in certain cases, the solution of actinide(s) (IV) and actinide(s) (III) prepared as described above, by mixing the at least two solutions of actinide An$^{1}$ (III) and actinide An$^1$(IV) each containing a singly charged stabilizing cation, may be obtained more directly, sometimes advantageously. For example, it may be obtained more directly by mixing at least two solutions each containing one or more actinides, and adding the said singly charged cation in the mixture or beforehand in the solutions of actinide(s) before mixing, this addition optionally being carried out during a step of chemical or electrochemical reduction in order to obtain the required oxidation states (IV) and/or (III). For example, it may be obtained more directly from a single solution containing at least one actinide An$^1$ and at least one actinide An$^{1}$, and adding the said singly charged cation in the mixture or beforehand in the solutions of actinide(s) before mixing, this addition optionally being carried out during a step of chemical or electrochemical reduction in order to obtain the required oxidation states (IV) and (III).

The next step in the method according to the invention is the coprecipitation or simultaneous precipitation of all the one or more actinides (IV) and all the one or more actinides (III) which are present, for example U(IV) and Pu(III).

This coprecipitation is preferably carried out by mixing an oxalic acid solution, or optionally a solution containing oxalate ions such as an ammonium oxalate solution, with the mixture of actinides (IV) and (III) as described above.

This coprecipitation takes place homogeneously according to the invention, owing to the existence of mixed oxalate compounds of actinides (IV) and (III), and calcining the precipitate therefore leads to a mixed compound, for example a mixed oxide (An$^1$,An$^{1}$)O$_2$ such as (U,Pu)O$_2$, which is also perfectly homogeneous especially in the case of U(IV) and Pu(III).

When oxalic acid is used for carrying out the coprecipitation, the invention has a series of particular additional advantages:

The reagent is already used in the "PUREX" method for the final conversion of plutonium nitrate obtained from the purification cycles into PuO$_2$. Its use in a method for An$^1$,An$^{1}$ coprecipitation, such as a method for U,Pu coprecipitation, is a priori compatible with the equipment existing in reprocessing plants;

Decomposition of the actinide oxalates is straightforward, and generally leads to compounds such as oxides having a good capacity for sinterability;

Industrial scale management of this reagent in effluents is nowadays well mastered.

An excess of oxalate ions is preferably used with respect to the reaction stoichiometry with the actinides present in the mixture of actinides (IV) and (III) as described above. It is preferably selected so as to obtain an oxalate ion concentration of from 0.05 to 0.25 mol.l$^{-1}$, and preferably from 0.10 to 0.20 mol.l$^{-1}$, in the supernatant solution over the coprecipitate. The acidity of the mixture of actinides (IV) and (III) as described above is preferably adjusted so as to obtain a free acidity of from 0.25 to 2.5 mol.l$^{-1}$, and preferably from 0.5 to 1.5 mol.l$^{-1}$, in the supernatant solution over the coprecipitate.

The coprecipitation is generally carried out at the same temperature as the previous steps, i.e. generally at a temperature of from 0 to 60° C., and it yields a totally homogeneous compound, for example a mixed oxalate of actinides (IV) and (III) and the singly charged stabilizing cation.

This compound is separated from the mixture, or more precisely from the supernatant, by any suitable liquid-solid separation means, for example filtering, centrifuging or the like.

If the intention is to prepare a mixed compound, such as a mixed oxide, the recovered coprecipitate is then calcined in an atmosphere suited to the nature of the mixed compound intended, according to likewise suitable temperature programming.

For example, if the intention is to prepare a mixed oxide $(An^1,An^{1'})O_2$ such as $(U,Pu)O_2$ from the coprecipitate consisting of the mixed oxalate of U(IV) and Pu(III), the calcining is preferably carried out in an inert atmosphere at a temperature of at least 650° C. (preferably 950° C.) and for a minimum duration of one hour (preferably 2 hours or more).

The final calcining temperature, for example 950° C., is preferably reached by carrying out temperature rises and using holding times at temperatures of, for example, 150 and 600° C.

The second embodiment of the method of the invention will now be described, which is a particular case in which the actinides to be coprecipitated can coexist in solution in the oxidation states (IV) and (III), without adding a cation which acts as a redox stabilizing agent and which is very generally an anti-nitrous agent.

In this second embodiment:

at least a first solution of actinide $An^1$ contains this actinide in oxidation state (IV) (it is, for example, a nitric solution of plutonium (IV)). The actinide concentration is generally from $10^{-4}$ to 1 mol.l$^{-1}$, preferably between 0.1 and 0.5 mol.l$^{-1}$;

the acidity is generally from 0.1 to 5 mol.l$^{-1}$, preferably from 1.0 to 1.5 mol.l$^{-1}$;

at least a second aqueous solution of actinide $An^{1'}$ contains this actinide in oxidation state (III) (it is, for example, a solution of Am(III) such as a nitric solution of Am(III). The actinide concentration and the acidity are in the same range as before.

The at least two solutions are intimately mixed.

A singly charged cation consisting only of oxygen, carbon, nitrogen and hydrogen atoms and not having redox properties vis-à-vis the actinides involved, is added by means of a solution or salt to the solution containing the actinides in oxidation states (IV) and (III) in order to obtain a solution containing the actinides to be precipitated and the singly charged cation.

This singly charged cation should not be confused with the singly charged so-called "stabilizing" cation used in the first embodiment, because it does not have properties of stabilizing the oxidation states.

This singly charged cation is selected, for example, from the ammonium ion and substituted ammonium ions such as alkyl ammonium ions, more particularly from quaternary ammonium ions such as tetraalkyl ammonium ions, the preferred ion among all of these being the ammonium ion.

As for the first embodiment, the two solutions are mixed without being hampered by redox reactions, and without affecting the oxidation state (IV) and the oxidation state (III) of the actinides before mixing.

The total concentration of actinides (IV) in this mixture is generally from $10^{-4}$ to 1 mol.l$^{-1}$, preferably between 0.1 and 0.2 mol.l$^{-1}$.

The total concentration of actinides (III) in this mixture is generally from $10^{-4}$ to 1 mol.l$^{-1}$, preferably between 0.1 and 0.2 mol.l$^{-1}$. It preferably does not exceed the total concentration of actinides (IV) in the mixture.

Furthermore, the mixing proportions of the various solutions of actinides (IV) and (III) are usually those which correspond to the proportions of the actinides in the final mixed compound, such as a final mixed oxide.

The description of the rest of the steps of the method in this second embodiment, i.e. the coprecipitation and the calcining, is subsequently the same as in the first embodiment of the invention, or general case, dealt with above. Specifically, this coprecipitation is preferably carried out by mixing an oxalic acid solution, or optionally a solution containing oxalate ions such as a solution of ammonium oxalates, with the mixture of actinides (IV) and (III) as described above.

This coprecipitation takes place homogeneously according to the invention, owing to the existence of mixed oxalate compounds of actinides (IV) and (III), and calcining the precipitate therefore leads to a mixed compound, for example a mixed oxide $(An^1,An^{1'})O_2$ such as $(Pu,Am)O_2$, which is also perfectly homogeneous especially in the case of Pu(IV) and Am(III).

An excess of oxalate ions is preferably used with respect to the reaction stoichiometry with the actinides present in the mixture of actinides (IV) and (III) as described above. It is preferably selected so as to obtain an oxalate ion concentration of from 0.05 to 0.25 mol.l$^{-1}$, and preferably from 0.10 to 0.20 mol.l$^{-1}$, in the supernatant solution over the coprecipitate. The acidity of the mixture of actinides (IV) and (III) as described above is preferably adjusted so as to obtain a free acidity of from 0.25 to 2.5 mol.l$^{-1}$, and preferably from 0.5 to 1.5 mol.l$^{-1}$, in the supernatant solution over the coprecipitate.

The coprecipitation is generally carried out at the same temperature as the previous steps, i.e. generally at a temperature of from 0 to 60° C., and it yields a totally homogeneous compound, for example a mixed oxalate of actinides (IV) and (III) and the singly charged cation.

This compound is separated from the mixture, or more precisely from the supernatant, by any suitable liquid-solid separation means, for example filtering, centrifuging or the like.

If the intention is to prepare a mixed compound, such as a mixed oxide, the recovered coprecipitate is then calcined in an atmosphere suited to the nature of the mixed compound intended, according to likewise suitable temperature programming.

For example, if the intention is to prepared a mixed oxide $(An^1,An^{1'})O_2$ such as $(Pu,Am)O_2$ from the coprecipitate consisting of the mixed oxalate of Pu(IV) and Am(III), the calcining is preferably carried out in air at a temperature of at least 650° C. (preferably 950° C.) and for a minimum duration of one hour (preferably 2 hours or more).

The final calcining temperature, for example 950° C., is preferably reached by carrying out temperature rises and using holding times at temperatures of, for example, 150 and 600° C.

The third embodiment of the method, which is less common, consists in adding a singly charged cation consisting only of oxygen, carbon, nitrogen and hydrogen ions in the precipitating solution, instead of adding it in the solution containing the actinides to be precipitated.

This cation does not act as a stabilizer (since it is not added in the solution of actinide), but it may be identical to the singly charged stabilizing cation of the first embodiment or the singly charged (non-stabilizing) cation of the second embodiment.

This precipitating solution is an ammonium oxalate solution, for example, the ammonium acting as this singly charged cation.

Stabilization of the oxidation states (IV) and (III) of the actinides in the solution containing the actinides to be precipitated should nevertheless be ensured, if necessary, by adding a cationic or non-cationic anti-nitrous agent and/or antioxidant, i.e. for example selected as a function of the actinides involved from the following compounds: sulfamic acid, urea, hydrogen peroxide, hydroxylamine, ascorbic acid, or by suitable reducing conditions which do not interfere during the coprecipitation or calcining of the coprecipitate consisting of the mixed oxalate.

The description of the rest of the steps of the method in this third embodiment, i.e. the precipitation, is subsequently the same as in the first embodiment of the invention, or general case, dealt with above.

EXAMPLES 1 to 6

The invention will now be described with reference to the following examples, which are given by way of illustration without implying any limitation.

Example 1

In this example, U(IV) and Pu(III) stabilized in solution by the hydrazinium ion are coprecipitated using an oxalic acid solution.

The operating conditions are as follows:

Actinide Mixture:

$[U(IV)]=[Pu(III)]=0.056$ mol.l$^{-1}$ $[N_2H_5^+]=0.10$ mol.l$^{-1}$ $[HNO_3]=1.0$ mol.l$^{-1}$ Precipitating Solution:

$[H_2C_2O_4]=0.50$ mol.l$^{-1}$ $[HNO_3]=1.0$ mol.l$^{-1}$

The simultaneous and homogeneous coprecipitation is obtained by mixing the actinide mixture and the precipitating solution intimately in equal proportions at room temperature.

Calcining the oxalate coprecipitate in argon for one hour at more than 650° C. produces a perfectly homogeneous mixed oxide (U,Pu)O$_2$ corresponding to a solid solution.

The precipitation yield for each actinide is more than 99%.

Example 2

In this example, U(IV) and Pu(III) stabilized in solution by the hydrazinium ion are coprecipitated using an oxalic acid solution, the uranium and plutonium being in different proportions.

The operating conditions are as follows:

Actinide Mixture:

$[U(IV)]=0.080$ mol.l$^{-1}$ $[Pu(III)]=0.0305$ mol.l$^{-1}$ $[N_2H_5^+]=0.10$ mol.l$^{-1}$ $[HNO_3]=1.0$ mol.l$^{-1}$ Precipitating Solution:

$[H_2C_2O_4]=0.51$ mol.l$^{-1}$ $[HNO_3]=1.0$ mol.l$^{-1}$

The simultaneous and homogeneous coprecipitation is obtained by mixing the actinide mixture and the precipitating solution intimately in equal proportions at room temperature.

The precipitation yield for each actinide is more than 99%.

Calcining the coprecipitate, consisting of a homogeneous mixed oxalate, in argon for one hour at more than 650° C. produces a perfectly homogeneous mixed oxide (U$_{0.725}$, Pu$_{0.275}$)O$_2$ corresponding to a solid solution.

Example 3

In this example, U(IV) and Pu(III) stabilized in solution by the hydrazinium ion are coprecipitated using an oxalic acid solution, there being very much more uranium than plutonium.

The operating conditions are as follows:

Actinide Mixture:

$[U(IV)]=0.099$ mol.l$^{-1}$ $[Pu(III)]=0.0075$ mol.l$^{-1}$ $[N_2H_5^+]=0.10$ mol.l$^{-1}$ $[HNO_3]=1.0$ mol.l$^{-1}$ Precipitating Solution:

$[H_2C_2O_4]=0.51$ mol.l$^{-1}$ $[HNO_3]=1.0$ mol.l$^{-1}$

The simultaneous and homogeneous coprecipitation is obtained by mixing the actinide mixture and the precipitating solution intimately in equal proportions at room temperature.

The precipitation yield for each actinide is more than 99%.

Calcining the coprecipitate, consisting of a homogeneous mixed oxalate, in argon for one hour at more than 650° C. produces a perfectly homogeneous mixed oxide (U$_{0.93}$, Pu$_{0.07}$)O$_2$ corresponding to a solid solution.

Example 4

In this example Th(IV) and Pu(III), the latter being stabilized in solution by the hydrazinium ion, are coprecipitated using an oxalic acid solution, the thorium and plutonium being in different proportions.

The operating conditions are as follows:

Actinide Mixture:

$[Th(IV)]=0.16$ mol.l$^{-1}$ $[Pu(III)]=0.04$ mol.l$^{-1}$ $[N_2H_5^+]=0.20$ mol.l$^{-1}$ $[HNO_3]=1.0$ mol.l$^{-1}$ Precipitating Solution:

$[H_2C_2O_4]=0.7$ mol.l$^{-1}$ $[HNO_3]=1.0$ mol.l$^{-1}$

The simultaneous and homogeneous coprecipitation is obtained by mixing the actinide mixture and the precipitating solution intimately in equal proportions at room temperature.

The precipitation yield for each actinide is more than 99%.

Calcining the coprecipitate, consisting of a homogeneous mixed oxalate, in air for one hour at more than 650° C. produces a perfectly homogeneous mixed oxide $(Th_{0.80}, Pu_{0.20})O_2$ corresponding to a solid solution.

Example 5

In this example Th(IV), U(IV), Np(IV), Pu(III) and Am(III), the U(IV), Np(IV) and Pu(III) being stabilized in solution in the mixture by the hydrazinium ion, are coprecipitated using an oxalic acid solution.

The operating conditions are as follows:

Actinide Mixture:

$[Th(IV)]=0.12$ mol.l$^{-1}$ $[U(IV)]=0.04$ mol.l$^{-1}$ $[Np(IV)]=0.02$ mol.l$^{-1}$ $[Pu(III)]=0.02$ mol.l$^{-1}$ $[Am(III)]=0.0001$ mol.l$^{-1}$ $[N_2H_5^+]=0.20$ mol.l$^{-1}$ $[HNO_3]=1.0$ mol.l$^{-1}$ Precipitating Solution:

$[H_2C_2O_4]=0.7$ mol.l$^{-1}$ $[HNO_3]=1.0$ mol.l$^{-1}$

The simultaneous and homogeneous coprecipitation is obtained by mixing the actinide mixture and the precipitating solution intimately in equal proportions at room temperature.

The precipitation yield for each actinide (except for americium) is more than 99%; that of americium, which in this example is much less concentrated than the other actinides in the mixture, is better than or of the order of 80%.

Calcining the coprecipitate, consisting of a homogeneous mixed oxalate, in argon for one hour at more than 650° C. produces a perfectly homogeneous mixed oxide $(Th_{0.60}, U_{0.20},Np_{0.10},Pu_{0.10},Am_{0.0005})O_2$ close or corresponding to a solid solution.

Example 6

In this example, Pu(IV) and Am(III) are coprecipitated using an oxalic acid solution, the plutonium and americium being in different proportions. The Pu(IV) and Am(III) are stable in the mixture, even in the absence of an anti-nitrous agent. Consequently, the ammonium ion is added in the mixture with the aid of a previously acidified solution of ammonia.

The operating conditions are as follows:

Actinide Mixture:

$[Pu(III)]=0.16$ mol.l$^{-1}$ $[Am(III)]=0.04$ mol.l$^{-1}$ $[NH_4^+]=0.20$ mol.l$^{-1}$ $[HNO_3]=0.8$ mol.l$^{-1}$ Precipitating Solution:

$[H_2C_2O_4]=0.7$ mol.l$^{-1}$ $[HNO_3]=0.8$ mol.l$^{-1}$

The simultaneous and homogeneous coprecipitation is obtained by mixing the actinide mixture and the precipitating solution intimately in equal proportions at room temperature.

The precipitation yield for each actinide (except for americium) is more than 99%.

Calcining the coprecipitate, consisting of a homogeneous mixed oxalate, in air for one hour at more than 650° C. produces a homogeneous mixed oxide $(Pu_{0.80},Am_{0.20})O_2$ close or corresponding to a solid solution.

The invention claimed is:

1. A method for coprecipitation or simultaneous precipitation of at least one actinide in oxidation state (IV) with at least one actinide in oxidation state (III), comprising:

a) adding a singly charged stabilizing cation consisting of atoms selected from the group consisting of oxygen, carbon, nitrogen and hydrogen atoms, or a compound capable of forming said singly charged stabilizing cation, to one or more solutions of actinide(s) containing overall at least one actinide $An^1$ and at least one actinide $An^{i1}$, so as to obtain a solution or mixture, of at least one actinide $An^1$ in oxidation state (IV), at least one actinide $An^{i1}$ in oxidation state (III) and said singly charged stabilizing cation, the value of the oxidation states (IV) and (III) having optionally been obtained during a preliminary or simultaneous step of chemical or electrochemical reduction; and b) adding a solution of oxalic acid or one of its salts or a derivative thereof to said solution or mixture, whereby coprecipitation or simultaneous precipitation of said actinides $An^1(IV)$ and $An^{i1}(III)$ and a fraction of the singly charged stabilizing cation from said solution or mixture is carried out.

2. The method according to claim 1, wherein said singly charged stabilizing cation or said compound capable of forming said singly charged stabilizing cation is added in the form of a solution of said cation or said compound capable of forming said cation, which cation solution or compound capable of forming said cation solution is mixed with said one or more solutions of actinide(s).

3. The method according to claim 1, wherein step a) is carried out in the following way:

a singly charged stabilizing cation consisting of atoms selected from the group consisting of oxygen, carbon, nitrogen and hydrogen atoms, or a compound capable of forming said singly charged stabilizing cation, is added to at least a first aqueous solution of at least one actinide $An^1$, so as to stabilize the oxidation state of the at least one actinide $An^1$ at the value (IV), this value (IV) of the oxidation state having optionally been obtained during a preliminary or simultaneous step of chemical or electrochemical reduction;

said singly charged stabilizing cation or said compound capable of forming said singly charged stabilizing cation is added to at least a second aqueous solution of at least one actinide $An^{i1}$, so as to stabilize the oxidation state of the at least one actinide $An^{i1}$ at the value (III), this value (III) of the oxidation state having optionally been obtained during a preliminary or simultaneous step of chemical or electrochemical reduction;

said at least first and second aqueous solutions each containing the singly charged stabilizing cation are intimately mixed.

4. The method according to claim 1, wherein step a) is carried out by adding said singly charged stabilizing cation, or the compound capable of forming said singly charged stabilizing cation, to a single solution containing at least one actinide $An^1$ capable of being stabilized at oxidation level (IV) and at least one actinide $An'^1$ capable of being stabilized at oxidation level (III), optionally during a preliminary or simultaneous, chemical or electrochemical step of redox adjustment of said actinides $An^1$ and $An'^1$ respectively in oxidation states (IV) and (III), to obtain said solution or mixture of at least one actinide $An^1$ in oxidation state (IV), at least one actinide $An'^1$ in oxidation state (III) and the singly charged stabilizing cation.

5. The method according to claim 1, wherein mixture to which the solution of oxalic acid or one of its salts or a derivative thereof is added is prepared by reverse co-extraction of said actinides $An^1$(IV) and $An'^1$(III) present in an organic phase in an aqueous solution containing said singly charged stabilizing cation.

6. The method according to claim 1, wherein said singly charged stabilizing cation is selected from the group consisting of cations which act as an anti-nitrous agent.

7. The method according to claim 6, wherein said singly charged stabilizing cation is selected from the group consisting of a hydrazinium ion and hydrazinium ions having one or more alkyl groups.

8. The method according to claim 1, wherein the step of chemical or electrochemical reduction is carried out in the following way:
for uranium, the reduction of U(VI) to U(IV) in a nitric medium is carried out by hydrogen under pressure with a catalytic support, in the presence of an anti-nitrous agent;
for neptunium, the reduction of Np(VI) to Np(IV) or Np(V) to Np(IV) is carried out by hydroxylamine in a nitric medium;
for plutonium, the reduction of Pu(VI) to Pu(IV) is carried out in a nitric medium by adding hydrogen peroxide, or the reduction of Pu(IV, V, VI) to Pu(III) is carried out in a nitric medium in the presence of hydrazinium ions by electrolysis at a suitable potential;
for protactinium, the reduction of Pa(V) to Pa(IV) is carried out by electrolysis in a complexing acidic medium.

9. The method according to claim 1, wherein said solutions of actinides $An^1$ and $An'^1$ are acidic solutions.

10. The method according to claim 9, wherein said solutions of actinides are aqueous nitric acid solutions.

11. The method according to claim 1, wherein the concentration of the actinides $An^1$ and of the actinides $An'^1$ in each of the solutions is from $10^{-4}$ to 1 mol.$l^{-1}$.

12. The method according to claim 1, wherein a ratio of the number of moles of stabilizing or non-stabilizing singly charged cation present in said solution of actinides, and/or in the precipitating oxalic acid solution, to the number of moles of all the actinides $An^1$ and $An'^1$ to be precipitated is generally from 0.5 to 5.

13. The method according to claim 1, wherein proportions of the actinides in said solution or mixture of one or more actinides (IV) and one or more actinides (III) correspond to respective proportions of the actinides in a mixed compound, which can be prepared by calcining from the coprecipitate.

14. The method according to claim 1, wherein sum of the molar concentrations of the actinides in oxidation state (IV) exceeds the sum of the molar concentrations of the actinides in oxidation state (III) in the solution or mixture from which the coprecipitation is carried out.

15. The method according to claim 1, wherein the method is carried out at a temperature of between 0° C. and a boiling point of the solution or mixture in step a).

16. The method according to claim 1, wherein the coprecipitation or simultaneous precipitation is carried out by intimately mixing a solution containing oxalate ions and the solution or mixture of at least one actinide (IV) and at least one actinide (III).

17. The method according to claim 1, wherein the actinide or actinides in oxidation state (IV) are selected from the group consisting of thorium(IV), protactinium(IV), neptunium(IV), uranium(IV) and plutonium(IV).

18. The method according to claim 1, wherein the actinide or actinides in oxidation state (III) are selected from the group consisting of plutonium(III), americium(III), curium(III), berkelium(III) and californium(III).

19. The method according to claim 1, wherein $An^1$ is U and $An'^1$ is Pu.

20. A method for preparation of mixed compounds of the actinides $An^1$ and $An'^1$, comprising coprecipitating said actinides in oxidation state (IV) and oxidation state (III) according to the method of claim 1 and calcining the obtained precipitate.

21. The method according to claim 20, wherein the calcining is carried out in an oxidizing, inert or reducing atmosphere, at a temperature equal to or greater than 650° C. and for a duration of greater than or equal to 1 hour.

22. The method according to claim 20, wherein the mixed compounds which are prepared are selected from the group consisting of mixed nitrides, carbides and oxides of actinides.

23. The method according to claim 22, wherein carbon is added during the calcining to prepare mixed compounds selected from the group consisting of mixed nitrides and carbides of actinides.

24. The method according to claim 23, wherein the calcining is carried out at a temperature greater than or equal to 1000° C.

25. A method for the fabrication of MOX nuclear fuel comprising preparing a mixed uranium and plutonium oxide according to claim 22 and then fabricating the MOX nuclear fuel from the mixed uranium and plutonium oxide.

26. The method according to claim 1, wherein the concentration of the actinides $An^1$ and of the actinides $A'^1$ is from 0.1 to 0.5 mol.$l^{-1}$ in the solutions of $An^1$ or $An'^1$.

27. The method according to claim 1, wherein the concentration of the actinides $An^1$ and of the actinides $An'^1$ is from 0.1 to 0.2 mol.$l^{-1}$ in the solution or mixture of actinides $An^1$(IV) and $An'^1$(III) from which the coprecipitation is carried out.

28. The method according to claim 1, wherein a ratio of the number of moles of stabilizing or non-stabilizing singly charged cation present in the solution or mixture of actinides, and/or in the precipitating oxalic solution, to the number of moles of all the actinides $An^1$ and $An'^1$ to be precipitated is generally from 0.5 to 1.

29. The method according to claim 3, wherein the step of chemical or electrochemical reduction is carried out in the following way:
for uranium, the reduction of U(VI) to U(IV) in a nitric medium is carried out by hydrogen under pressure with a catalytic support, in the presence of an anti-nitrous agent;
for neptunium, the reduction of Np(VI) to Np(IV) or Np(V) to Np(IV) is carried out by hydroxylamine in a nitric medium;
for plutonium, the reduction of Pu(VI) to Pu(IV) is carried out in a nitric medium by adding hydrogen peroxide, or the reduction of Pu(IV, V, VI) to Pu(III) is carried out in a nitric medium in the presence of hydrazinium ions by electrolysis at a suitable potential;

for protactinium, the reduction of Pa(V) to Pa(IV) is carried out by electrolysis in a complexing acidic medium.

30. A method for coprecipitation or simultaneous precipitation of at least one actinide in oxidation state (IV) with at least one actinide in oxidation state (III), comprising:
intimately mixing at least a first aqueous solution of at least one actinide $An^1$ in oxidation state (IV) and at least a second aqueous solution of at least one actinide $An'^1$ in oxidation state (III) to obtain a mixture;
adding a singly charged cation consisting of atoms selected from the group consisting of oxygen, carbon, nitrogen and hydrogen atoms and not having redox properties vis-à-vis the actinides to be coprecipitated, or a compound capable of forming said singly charged cation, to said mixture in order to obtain a solution containing the actinides to be precipitated and the singly charged cation; and
adding a solution of oxalic acid or one of its salts or a derivative thereof to said solution which is obtained after adding the singly charged cation, whereby coprecipitation or simultaneous precipitation of the actinides in oxidation states (IV) and (III), $An^1$(IV) and $An'^1$(III), and a fraction of the singly charged cation from said solution is carried out.

31. The method according to claim 30, wherein said singly charged cation is selected from the group consisting of an ammonium ion and substituted ammonium ions.

32. The method according to claim 30, wherein said singly charged cation is a tetraalkyl ammonium ion.

33. The method according to claim 30, wherein said solutions of actinides $An^1$ and $An'^1$ are acidic solutions.

34. The method according to claim 33, wherein said solutions of actinides are aqueous nitric acid solutions.

35. The method according to claim 30, wherein the concentration of the actinides $An^1$ and of the actinides $An'^1$ in each of the solutions is from $10^{-4}$ to 1 $mol.l^{-1}$.

36. The method according to claim 30, wherein a ratio of the number of moles of stabilizing or non-stabilizing singly charged cation present in said solution of actinides, and/or in the precipitating oxalic acid solution, to the number of moles of all the actinides $An^1$ and $An'^1$ to be precipitated is generally from 0.5 to 5.

37. The method according to claim 30, wherein proportions of the actinides in said solution or mixture of one or more actinides (IV) and one or more actinides (III) correspond to respective proportions of the actinides in a mixed compound, which can be prepared by calcining from the coprecipitate.

38. The method according to claim 30, wherein a sum of the molar concentrations of the actinides in oxidation state (IV) exceeds the sum of the molar concentrations of the actinides in oxidation state (III) in the solution or mixture from which the coprecipitation is carried out.

39. The method according to claim 30, wherein the method is carried out at a temperature of between 0° C. and a boiling point of the mixture obtained by the intimately mixing step.

40. The method according to claim 30, wherein the coprecipitation or simultaneous precipitation is carried out by intimately mixing a solution containing oxalate ions and the solution or mixture of at least one actinide (IV) and at least one actinide (III).

41. The method according to claim 30, wherein the actinide or actinides in oxidation state (IV) are selected from the group consisting of thorium(IV), protactinium(IV), neptunium(IV), uranium(IV) and plutonium(IV).

42. The method according to claim 30, wherein the actinide or actinides in oxidation state (III) are selected from the group consisting of plutonium(III), americium(III), curium(III), berkelium(III) and californium(III).

43. The method according to claim 30, wherein $An^1$ is U and $An'^1$ is Pu.

44. A method for preparation of mixed compounds of the actinides $An^1$ and $An'^1$, comprising coprecipitating said actinides in oxidation state (IV) and oxidation state (III) according to the method of claim 30 and calcining the obtained precipitate.

45. The method according to claim 44, wherein the calcining is carried out in an oxidizing, inert or reducing atmosphere, at a temperature equal to or greater than 650° C. and for a duration of greater than or equal to 1 hour.

46. The method according to claim 44, wherein the mixed compounds which are prepared are selected from the group consisting of mixed nitrides, carbides and oxides of actinides.

47. The method according to claim 45, wherein the mixed compounds which are prepared are selected from the group consisting of mixed nitrides, carbides and oxides of actinides.

48. The method according to claim 46, wherein carbon is added during the calcining to prepare mixed compounds selected from the group consisting of mixed nitrides and carbides of actinides.

49. The method according to claim 47, wherein carbon is added during the calcining to prepare mixed compounds selected from the group consisting of mixed nitrides and carbides of actinides.

50. The method according to claim 48, wherein the calcining is carried out at a temperature greater than or equal to 1000° C.

51. The method according to claim 49, wherein the calcining is carried out at a temperature greater than or equal to 1000° C.

52. The method according to claim 33, wherein said solutions of actinides $An^1$ and $An'^1$ are aqueous acidic solutions.

53. The method according to claim 30, wherein the concentration of the actinides $An^1$ and of the actinides $An'^1$ is from 0.1 to 0.5 $mol.l^{-1}$ in the solutions of $An^1$ or $An'^1$.

54. The method according to claim 30, wherein the concentration of the actinides $An^1$ and of the actinides $An'^1$ is from 0.1 to 0.2 $mol.l^{-1}$ in the solution or mixture of actinides $An^1$ (IV) and $An'^1$ (III) from which the coprecipitation is carried out.

55. The method according to claim 30, wherein a ratio of the number of moles of stabilizing or non-stabilizing singly charged cation present in the solution or mixture of actinides, and/or in the precipitating oxalic solution, to the number of moles of all the actinides $An^1$ and $An'^1$ to be precipitated is generally from 0.5 to 1.

56. The method according to claim 30, wherein the value of the oxidation states (IV) and (III) has been obtained during a preliminary or simultaneous step of chemical or electrochemical reduction, and the step of chemical or electrochemical reduction is carried out in the following way:
for uranium, the reduction of U(VI) to U(IV) in a nitric medium is carried out by hydrogen under pressure with a catalytic support, in the presence of an anti-nitrous agent;
for neptunium, the reduction of Np(VI) to Np(IV) or Np(V) to Np(IV) is carried out by hydroxylamine in a nitric medium;
for plutonium, the reduction of Pu(VI) to Pu(IV) is carried out in a nitric medium by adding hydrogen peroxide, or the reduction of Pu(IV, V, VI) to Pu(III) is carried out in a nitric medium in the presence of hydrazinium ions by electrolysis at a suitable potential;

for protactinium, the reduction of Pa(V) to Pa(IV) is carried out by electrolysis in a complexing acidic medium.

57. A method for coprecipitation or simultaneous precipitation of at least one actinide in oxidation state (IV) with at least one actinide in oxidation state (III), comprising:
preparing an aqueous solution containing at least one actinide $An^1$ in oxidation state (IV) and at least one actinide $An'^1$ in oxidation state (III) by mixing at least two solutions each containing one of said actinides in the relevant oxidation state, when said actinides in said relevant oxidation states can coexist within the same solution; and
adding a solution of oxalic acid or one of its salts or a derivative thereof, to which a singly charged cation consisting of atoms selected from the group consisting of oxygen, carbon, nitrogen and hydrogen atoms, or a compound capable of forming said singly charged cation, has been added, to said solution of actinides, whereby coprecipitation or simultaneous precipitation of the actinides in oxidation states (IV) and (III) from said solution of actinides and a fraction of said cation contained in said solution is carried out.

58. The method according to claim 57, wherein the oxidation states (IV) and (III) of the actinides are furthermore stabilized by adding to them a cationic or non-cationic stabilizing agent selected from the group consisting of anti-nitrous compounds and antioxidant compounds.

59. The method according to claim 58, wherein said stabilizing agent is selected from the group consisting of sulfamic acids and their derivatives, hydrazine and hydrazine derivatives, hydroxylamine and hydroxylamine derivatives, urea and its derivatives; oximes; hydroxamic acid and its derivatives; hydrogen peroxide; and ascorbic acid and its salts.

60. The method according to claim 58, wherein said stabilizing agent is selected from the group consisting of sulfamic acid and its salts, hydrazine and its salts, and hydroxylamine and its salts.

61. The method according to claim 9, wherein said solutions are aqueous acidic solutions.

62. The method according to claim 57, wherein said singly charged cation is selected from the group consisting of an ammonium ion and substituted ammonium ions.

63. The method according to claim 57, wherein the value of the oxidation states (IV) and (III) has been obtained during a preliminary or simultaneous step of chemical or electrochemical reduction, and the step of chemical or electrochemical reduction is carried out in the following way:
for uranium, the reduction of U(VI) to U(IV) in a nitric medium is carried out by hydrogen under pressure with a catalytic support, in the presence of an anti-nitrous agent;
for neptunium, the reduction of Np(VI) to Np(IV) or Np(V) to Np(IV) is carried out by hydroxylamine in a nitric medium;
for plutonium, the reduction of Pu(VI) to Pu(IV) is carried out in a nitric medium by adding hydrogen peroxide, or the reduction of Pu(IV, V, VI) to Pu(III) is carried out in a nitric medium in the presence of hydrazinium ions by electrolysis at a suitable potential;
for protactinium, the reduction of Pa(V) to Pa(IV) is carried out by electrolysis in a complexing acidic medium.

64. The method according to claim 57, wherein said solutions of actinides $An^1$ and $An'^1$ are acidic solutions.

65. The method according to claim 64, wherein said solutions of actinides are aqueous nitric acid solutions.

66. The method according to claim 57, wherein the concentration of the actinides $An^1$ and of the actinides $An'^1$ in each of the solutions is from $10^{-4}$ to $1$ mol.l$^{-1}$.

67. The method according to claim 57, wherein a ratio of the number of moles of stabilizing or non-stabilizing singly charged cation present in said solution of actinides, and/or in the precipitating oxalic acid solution, to the number of moles of all the actinides $An^1$ and $An'^1$ to be precipitated is generally from 0.5 to 5.

68. The method according to claim 57, wherein proportions of the actinides in said solution or mixture of one or more actinides (IV) and one or more actinides (III) correspond to respective proportions of the actinides in a mixed compound, which can be prepared by calcining from the coprecipitate.

69. The method according to claim 57, wherein a sum of the molar concentrations of the actinides in oxidation state (IV) exceeds the sum of the molar concentrations of the actinides in oxidation state (III) in the solution or mixture from which the coprecipitation is carried out.

70. The method according to claim 57, wherein the method is carried out at a temperature of between 0° C. and a boiling point of the aqueous solution containing at least one actinide $An^1$ in oxidation state (IV) and at least one actinide $An'^1$ in oxidation state (III).

71. The method according to claim 57, wherein the coprecipitation or simultaneous precipitation is carried out by intimately mixing a solution containing oxalate ions and the solution or mixture of at least one actinide (IV) and at least one actinide (III).

72. The method according to claim 57, wherein the actinide or actinides in oxidation state (IV) are selected from the group consisting of thorium(IV), protactinium(IV), neptunium(IV), uranium(IV) and plutonium(IV).

73. The method according to claim 57, wherein the actinide or actinides in oxidation state (III) are selected from the group consisting of plutonium(III), americium(III), curium(III), berkelium(III) and californium(III).

74. The method according to claim 57, wherein $An^1$ is U and $An'^1$ is Pu.

75. A method for preparation of mixed compounds of the actinides $An^1$ and $An'^1$, comprising coprecipitating said actinides in oxidation state (IV) and oxidation state (III) according to the method of claim 57 and calcining the obtained precipitate.

76. The method according to claim 75, wherein the calcining is carried out in an oxidizing, inert or reducing atmosphere, at a temperature equal to or greater than 650° C. and for a duration of greater than or equal to 1 hour.

77. The method according to claim 75, wherein the mixed compounds which are prepared are selected from the group consisting of mixed nitrides, carbides and oxides of actinides.

78. The method according to claim 76, wherein the mixed compounds which are prepared are selected from the group consisting of mixed nitrides, carbides and oxides of actinides.

79. The method according to claim 77, wherein carbon is added during the calcining to prepare mixed compounds selected from the group consisting of mixed nitrides and carbides of actinides.

80. The method according to claim 78, wherein carbon is added during the calcining to prepare mixed compounds selected from the group consisting of mixed nitrides and carbides of actinides.

81. The method according to claim 79, wherein the calcining is carried out at a temperature greater than or equal to 1000° C.

82. The method according to claim 80, wherein the calcining is carried out at a temperature greater than or equal to 1000° C.

83. The method according to claim 57, wherein said singly charged cation is a tetralkyl ammonium ion.

84. The method according to claim 64, wherein said solutions are aqueous acidic solutions.

85. The method according to claim 57, wherein the concentration of the actinides $An^1$ and of the actinides $An'^1$ is from 0.1 to 0.5 mol.l$^{-1}$ in the solutions of $An^1$ or $An'^1$.

86. The method according to claim 57, wherein the concentration of the actinides $An^1$ and of the actinides $An'^1$ is from 0.1 to 0.2 mol.l$^{-1}$ in the solution or mixture of actinides $An^1$ (IV) and $An'^1$ (III) from which the coprecipitation is carried out.

87. The method according to claim 57, wherein a ratio of the number of moles of stabilizing or non-stabilizing singly charged cation present in the solution or mixture of actinides, and/or in the precipitating oxalic solution, to the number of moles of all the actinides $An^1$ and $An'^1$ to be precipitated is generally from 0.5 to 1.

* * * * *

UNITED STATES PATENT AND TRADEMARK OFFICE
CERTIFICATE OF CORRECTION

| | | |
|---|---|---|
| PATENT NO. | : 7,829,043 B2 | Page 1 of 1 |
| APPLICATION NO. | : 11/140282 | |
| DATED | : November 9, 2010 | |
| INVENTOR(S) | : Stéphane Grandjean et al. | |

It is certified that error appears in the above-identified patent and that said Letters Patent is hereby corrected as shown below:

Col. 23, line 12, after "wherein" insert --said solution or--

Signed and Sealed this
Twenty-eighth Day of June, 2011

David J. Kappos
*Director of the United States Patent and Trademark Office*